United States Patent [19]

Hand et al.

[11] Patent Number: 4,683,097
[45] Date of Patent: Jul. 28, 1987

[54] PROCESS OF MAKING A DUNNAGE RACK

[75] Inventors: George E. Hand, Excelsior; Roman A. Kramer, Bloomington, both of Minn.

[73] Assignee: Interplastic Corporation, Minneapolis, Minn.

[21] Appl. No.: 776,856

[22] Filed: Sep. 18, 1985

[51] Int. Cl.⁴ ............................................. B29C 39/10
[52] U.S. Cl. ................................. 264/268; 264/273; 264/274; 264/275
[58] Field of Search ............... 264/268, 273, 274, 275; 425/117, DIG. 117, DIG. 118; 249/83, 95; 29/527.1, 530

[56] References Cited

U.S. PATENT DOCUMENTS 4,296,063 10/1981 Sendo et al. ...................... 264/273

*Primary Examiner*—Jeffery Thurlow
*Assistant Examiner*—Leo B. Tentoni
*Attorney, Agent, or Firm*—Kinney & Lange

[57] ABSTRACT

The present invention provides a dunnage rack including a molded pallet having a plurality of legs with caster supports integrally secured thereto, and to a method of forming such a dunnage rack. The dunnage rack is formed by first providing a mold for the pallet. A lower end of each leg portion of the mold is then blanked off with a caster support. The caster supports include a base plate arranged to support a caster and a plurality of flanges which extend upwardly from the edge, of the base plate into the mold. The flanges have an irregular surface. In a preferred embodiment, the irregular surface is formed by a plurality of openings or apertures. A molding material introduced into the mold engages the flange irregular surface to secure the caster support to the pallet legs.

4 Claims, 4 Drawing Figures

U.S. Patent  Jul. 28, 1987  4,683,097
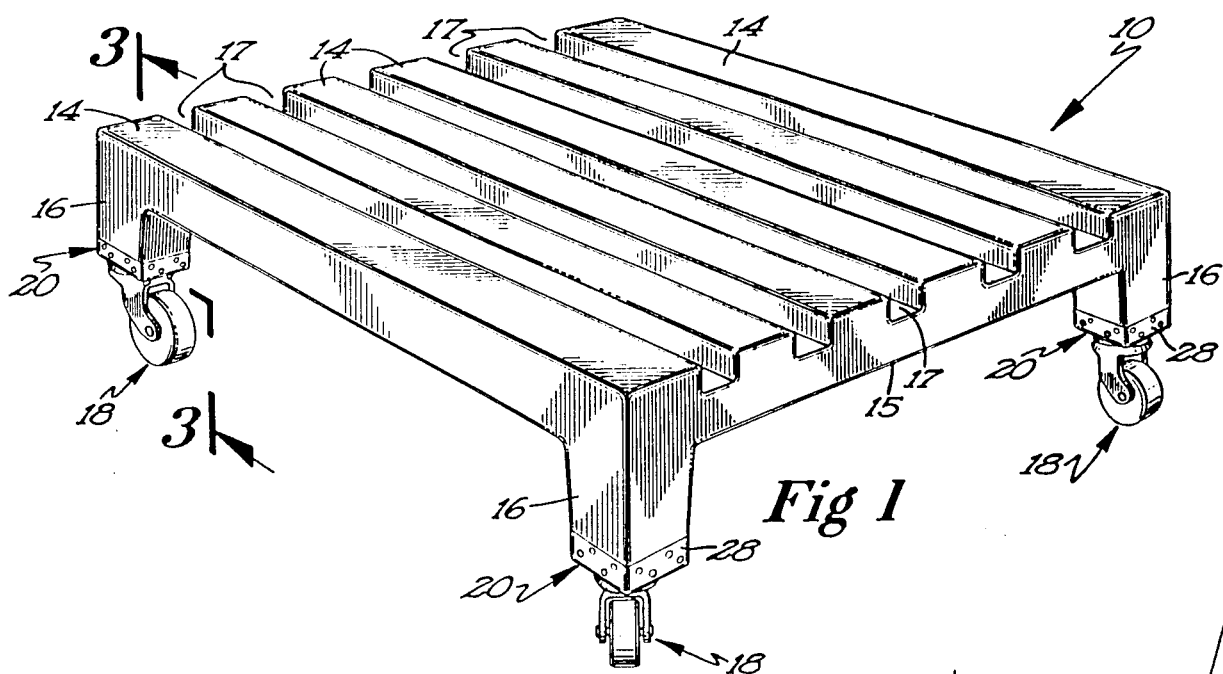
Fig 1
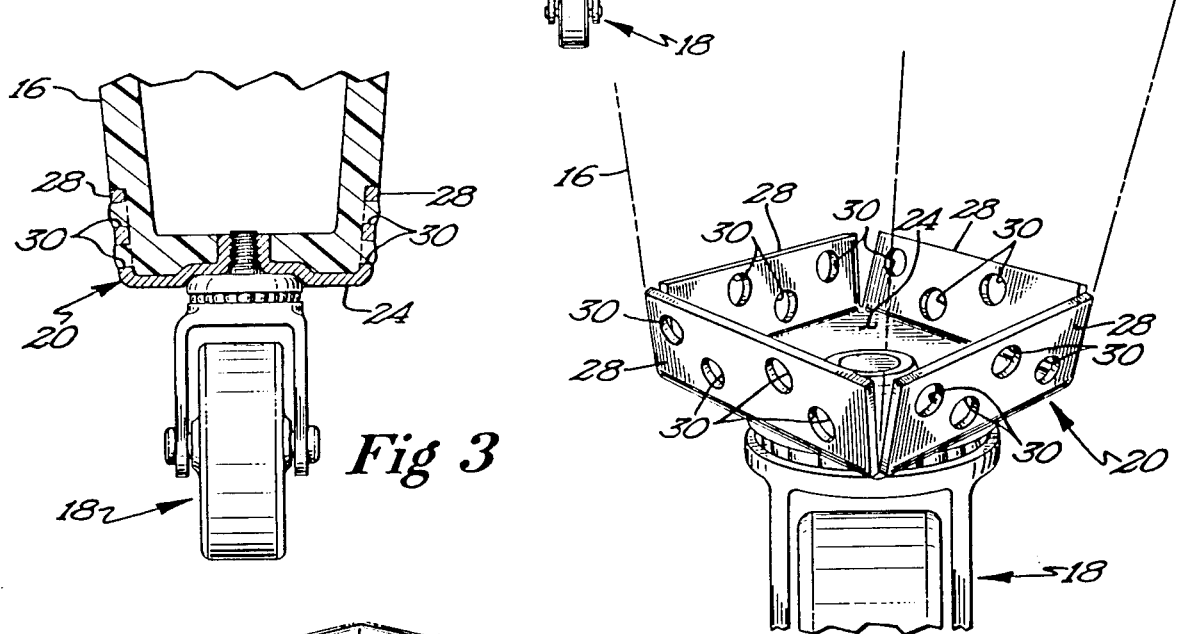
Fig 3
Fig 2
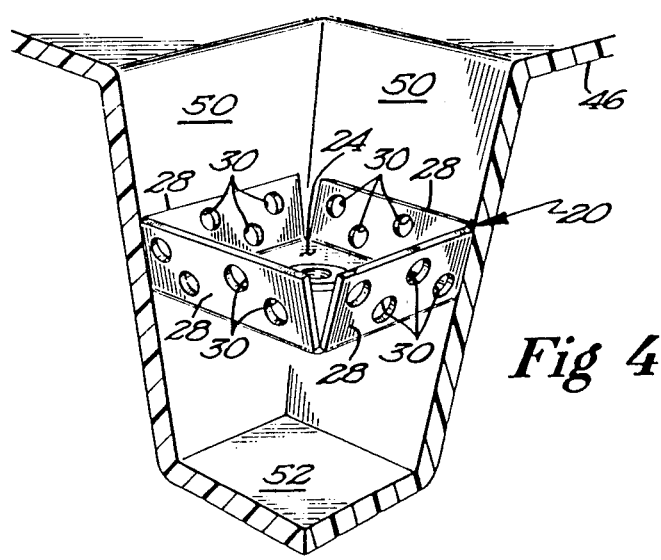
Fig 4

PROCESS OF MAKING A DUNNAGE RACK

BACKGROUND OF THE INVENTION

1. Field of the Invention.

The present invention relates generally to a dunnage rack for supporting and/or transporting objects and, particularly, to a molded plastic pallet having caster supports integrally secured thereto and a method of forming the molded plastic pallet with integral caster supports.

2. Description of the Prior Art.

Pallets or frames mounted on casters for transporting objects are known in the art. Typically, the casters are mounted on caster support plates which are secured to the pallet by fasteners, screws or bolts, for example. The use of fasteners to secure the caster support plates adds to the time required to mount the casters on the pallet and, accordingly, to the cost of construction. Over time, the screws or bolts can loosen or strip their threads (or the threads with which they engage) requiring periodic maintenance.

SUMMARY OF THE INVENTION

The dunnage rack of the present invention includes a molded plastic pallet having unitary molded legs to which caster supports are integrally secured. Mounted on each caster support is a caster.

The dunnage rack is formed in a mold as a pallet having a supporting surface, suitable reinforcement and a plurality of depending legs. A lower end of each mold leg portion is blanked off by a caster support. The caster support includes a base plate, at least one flange extending from the base plate into the mold and an assembly carried by the base plate receiving and supporting a caster. Molding material is introduced into the mold to form the pallet, including the legs, and to engage each flange of the caster supports. To enhance the engagement between the molding material and the flanges, the flanges may be formed with irregular surfaces. Thus, when the molding material sets, those flanges having irregular surfaces are inextricably engaged by the molding material, via the irregular surface, to permanently fix the caster supports to the legs of the pallet. Casters may then be mounted on the caster support assembly to support the pallet for movement.

BRIEF DESCRIPTION OF THE DRAWINGS

FIG. 1 is a perspective view of a dunnage rack of the present invention;

FIG. 2 is a perspective view of a caster assembly and caster supports in accordance with the present invention;

FIG. 3 is a cross sectional view taken along the line 3—3 in FIG. 1;

FIG. 4 is a perspective view of a leg section of a mold with the lower portion being "blanked" by a caster support in accordance with the present invention.

DETAILED DESCRIPTION OF THE PREFERRED EMBODIMENTS

A preferred embodiment of the dunnage rack of the present invention is generally indicated at 10 in FIG. 1. The dunnage rack 10 includes a molded plastic pallet or frame having upper support surface 14 and a plurality of unitary or integrally molded legs 16. A caster assembly 18 is carried by each leg 16 via caster support assemblies 20. Suitable reinforcement for the support surfaces 14 may be provided on the underside 15 of the pallet. In the illustrated preferred embodiment, channels 17 between the ribbed support surfaces 14 also provide reinforcement. Caster assemblies 18 engage caster support assemblies 20 in any desired manner.

As noted above and shown in FIGS. 2 and 3, caster assemblies 18 engage caster support assemblies 20. Each caster support assembly 20 includes a base plate 24 and a plurality of flanges 28, the flanges 28 being integrally connected to and extending generally upwardly from each edge of the base plate 24. In the illustrated embodiment, flanges 28 include a plurality of openings or apertures 30 into which molding material flows when the pallet is molded, to permanently fix the caster supports 20 to the legs 16 of the pallet. While a threaded engagement between caster assembly 18 and caster support assembly 20 is illustrated, any known caster arrangement may be employed. Also, while the preferred flange 28 arrangement is the illustrated, apertured arrangement, any suitable arrangement may be employed by which at least the inner, opposing surfaces of the flanges 28 engage the molding material. For example, roughened or ribbed inner surfaces may be employed. For the purposes of this specification and claims, the term "irregular surface" shall mean such roughened or ribbed surfaces as well as the illustrated apertured flanges.

The cooperation between the apertures 30 and the molding material that forms the legs 16 is illustrated in FIG. 3 wherein the molding material has entered the apertures 30 to secure or fix the caster support assembly 20 to the leg 16. As noted above, a similar securement may be obtained through roughened or ribbed inner surfaces on the flanges 28.

As illustrated in FIG. 4, the dunnage rack 10 of the present invention is formed in a mold 46 (only a portion of one leg of the mold 46 being shown). The side walls 50 of the mold leg portions are tapered so that the mold leg portions are narrowest adjacent their bottom wall 52. The caster support assembly 20 is dimensioned to mate in cross section with the mold leg portions of the mold 46, at a point spaced above the bottom wall 52. Thus, a portion of the mold leg portion is "blanked" by the caster support assembly 20. In this manner, by proper selection of the "blanked" distance between plate 24 of support assembly 20 and mold bottom wall 52 a pallet without casters may be formed with its supporting surface at the same height as a dunnage rack (with casters), utilizing the same mold.

The advantages of the dunnage rack 10 of the present invention include its low cost and maintenance free construction. Molding material having suitable strength and other desired characteristics is relatively inexpensive. Since the supports 20 are integrally secured to the pallet at the time the pallet is formed, the step of securing the caster supports with fasteners is eliminated. Because no fasteners are used, it is not necessary to periodically check for loosened fasteners. Any suitable molding method and molding material may be employed, dependent upon the particular application.

Although the present invention has been described with reference to preferred embodiments, workers skilled in the art will recognize that changes may be made in form and detail without departing from the spirit and scope of the invention.

What is claimed is:

1. A method of forming a dunnage rack with integrally secured caster supports, comprising the steps of:

providing a mold for forming a pallet having a plurality of legs;

positioning a caster support assembly within at least one lower end leg portion of the pallet mold, the caster support assembly including a base plate arranged with means for receiving a caster and at least one flange integrally connected to and projecting upward from an edge of the base plate and having an irregular surface with the base plate being positioned within said pallet mold leg portion at a location corresponding to the height of a caster to be received by said base plate; and introducing molding material into the mold such that the molding material engages the caster support flange irregular surface and also blocking said means for receiving a caster, whereby the length of a leg from said mold without caster support assembly and caster is generally equal to the length of a leg from said mold with caster support assembly and caster.

2. The method of claim 1 wherein said irregular surface comprises aperture means.

3. A method of forming a dunnage rack with integrally secured supports for receiving casters of known height, comprising the steps of:

providing a mold for forming a pallet, including means forming a plurality of legs integral with said pallet, each of said leg forming means having a bottom wall;

selectively positioning a caster support assembly within each leg forming means at a distance from the bottom wall of said leg forming means corresponding to said caster height, each caster support assembly including at least one flange having an irregular surface extending upwardly from the base plate; and introducing molding material into the mold to engage each flange irregular surface.

4. The method of claim 3 wherein said flange irregular surface comprises aperture means.

* * * * *